United States Patent [19]

Leonard

[11] Patent Number: 4,960,294
[45] Date of Patent: Oct. 2, 1990

[54] TRUCK MUD FLAP SUPPORT ARM

[76] Inventor: Charles F. Leonard, Rte. 1, Box 99, Star, Id. 83669

[21] Appl. No.: 397,017

[22] Filed: Aug. 21, 1989

Related U.S. Application Data

[63] Continuation-in-part of Ser. No. 245,703, Sep. 15, 1988, Pat. No. 4,877,267.

[51] Int. Cl.⁵ ................................................. B12B 9/16
[52] U.S. Cl. ..................................... 280/848; 280/851
[58] Field of Search ........................ 280/847, 848, 851; 248/289.1, 204, 145, 475.1, 584, 599; 403/111

[56] References Cited

U.S. PATENT DOCUMENTS

| | | | |
|---|---|---|---|
| 2,801,867 | 8/1957 | Childreth | 280/851 |
| 3,401,953 | 9/1968 | Prohl et al. | 280/851 |
| 3,940,165 | 2/1976 | Sogoian | 280/851 |
| 3,954,281 | 5/1976 | Juergens | 280/851 |
| 4,189,165 | 2/1980 | Leonard et al. | 280/851 |

Primary Examiner—Charles A. Marmor
Assistant Examiner—Richard Camby
Attorney, Agent, or Firm—Schroeder, Davis & Orliss Inc.

[57] ABSTRACT

A mud flap supporting assembly is provided that allows pivotal movement of mounting arm and mud flap about both the vertical and horizontal axes adjacent to the vehicle to which the arm is attached. A spring connected between the base plate and the end cap of the mounting arm holds the arm in the usual position parallel to the vehicle axle. Should the arm be pushed out of position by an obstruction making contact with the arm, the arm will automatically return to its usual position when the obstruction is passed. Upon return, the base plate's raised portion embeds itself into the exact duplicate negative opening of the mounting arm, and returns the arm precisely to center.

16 Claims, 5 Drawing Sheets

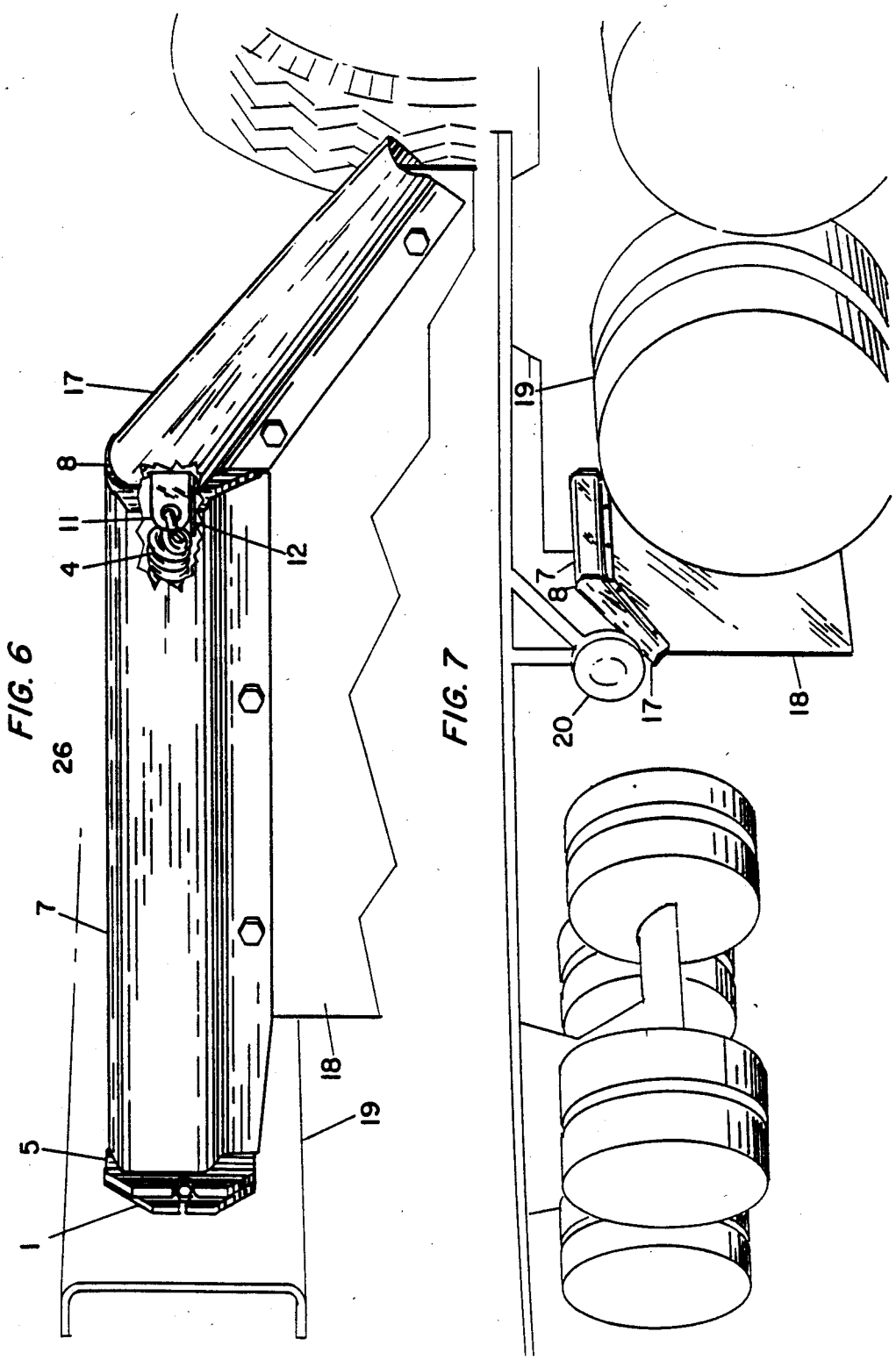

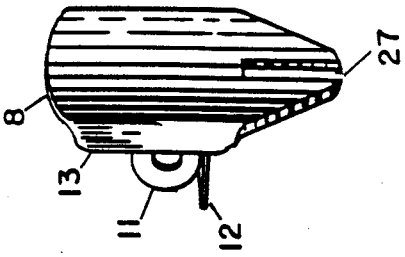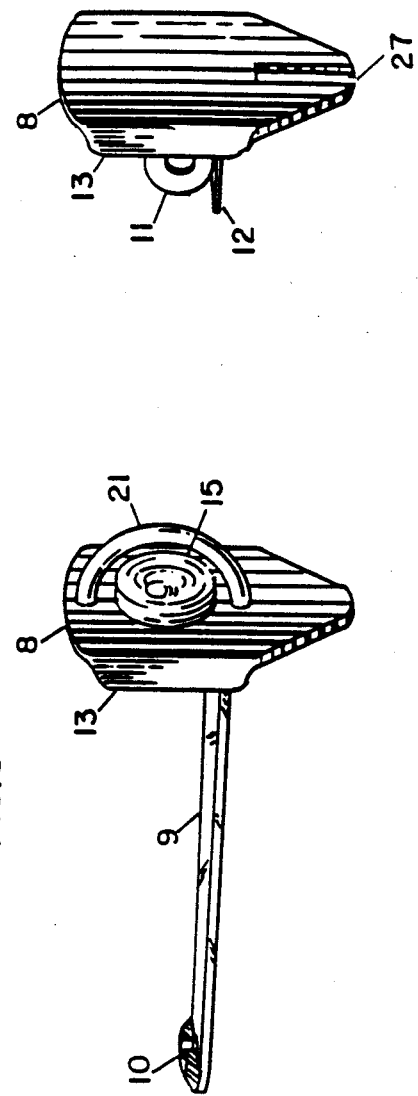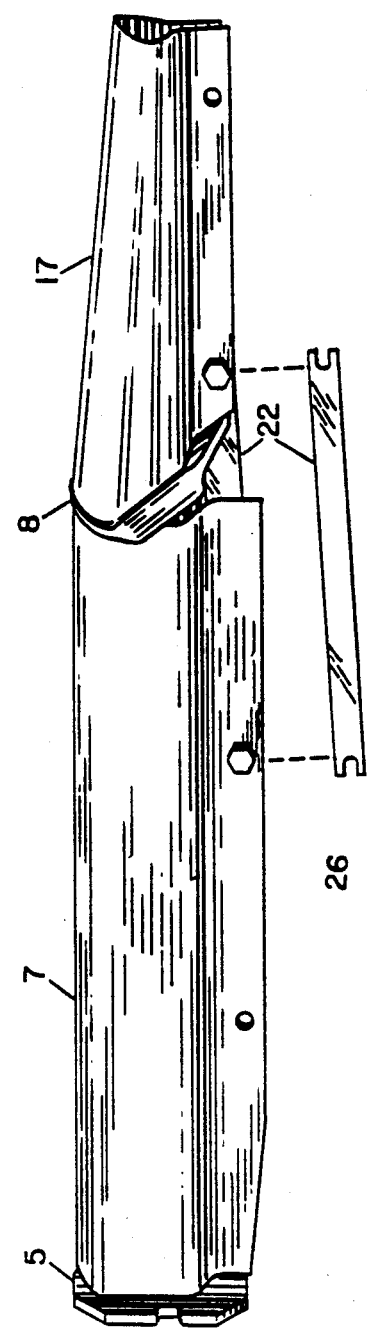

TRUCK MUD FLAP SUPPORT ARM

This application is a continuation-in-part of Ser. No. 07/245,703 filed Sept. 15,1988, which is now U.S. Pat. No. 4,877,267 issued Oct. 31, 1989.

BACKGROUND OF THE INVENTION

The present invention relates generally to a mud flap mounted behind the rear wheels of a vehicle to prevent mud and the like from being thrown to the rear of the vehicle and, more particularly, to a spring mounted mud flap support arm which is deflectable about a support to prevent damage to the mud flap support arm if the mud flap or support arm comes into contact with an obstruction. It is well-known in the prior art to provide deflectably mounted, spring loaded support arms for mounting a mud-flap on a truck or other vehicle. While such structures have in general been quite useful for logging trucks, in highway situations there have been some disadvantages associated with the typical prior art structures. Such prior art structures, as exemplified by U.S. Pat Nos. 2,652,266 and 2,801,867, have provided for up-and-down movement as well as movement about the vertical axis. When mud or the like builds up on the mud flap, however, the prior art support arms tend to droop due to their inability to support additional weight. Therefore the support arms do not maintain a constant vertical relationship with respect to the wheel. Also, there is a tendency in such prior art structures for the flaps to bounce and shake when the vehicle to which they are attached goes over small bumps in the road, which bouncing and shaking under some circumstances can have an effect on the life of the flaps. Additional prior art provided by U.S. Pat. No. 4,352,502 provides for a mounting suitable for highway use which allows movement about the vertical axis but does not allow the arm to yield upward should it be struck by an obstruction from below. Prior art provided by U.S. Pat. No. 3,401,953 and Canadian Patent 846-075 discloses a mud flap support arm rotatable in any direction from normally centered position and which is of sufficient strength to support a mud encrusted mud flap without drooping whether on a smooth or rough road. There is a possibility of failure, however, due to the return spring being anchored to the thin shell of the arm by a nut and bolt. This arrangement is sufficient for most loads but not for an extraordinarily large load such as may be encountered when the mounting arm is crushed between the vehicle tires and an obstacle.

SUMMARY OF THE INVENTION

The present invention provides a mud-flap support arm rotatably mounted on a base plate rigidly attached to a vehicle and deflectable in any direction from a normal position parallel to the vehicle axle. The support arm includes a spring operable to return the support arm to its normal position when the support arm has been deflected. The support arm includes a removable end cap which is easily replaced should it be damaged during use. The mud arm flat support is of sufficient strength to support the weight of the mud flap with or without the extra burden of mud or whether or not the vehicle operates on a smooth road. The end cap may be flat or elongated and pivotally mounted at the end of the arm has been devised to be the outside terminus of the return spring contributing immeasurably to the strength and reliability of the arm. A clearance light may be mounted on the end cap at the end of the support arm. Since the clearance light is mounted on the end cap, it is easily replaced and may be stocked by dealers, with its associated end cap and other interchangeable component parts, without having to stock the entire support arm assembly. Further, the end cap added part protects the end of the arm from damage also and protects operators from what previously was the open outside edge of the arm housing. The required spring is of a diameter and length that requires an extension to connect with the endcap. Additionally, by having the mounting arm become one smooth metallic piece of work uninterrupted by a nut and bolt at the mid point, the aesthetics are improved. The present invention provides a mud flap support arm having improved reliability, strength, safety and aesthetics.

BRIEF DESCRIPTION OF THE DRAWINGS

FIG. 6 is a side elevation cutaway showing internal detail of a second preferred embodiment of a mud flap support assembly according to the principles of the present invention mounted on the right rear of a vehicle in its normal position.

FIG. 7 is a perspective view of the support assembly of FIG. 6 and a trailer landing gear shown from the right front quarter of a vehicle.

FIG. 8 is a perspective view of one preferred embodiment of an end cap according to the principles of the present invention.

FIG. 9 is a perspective view of an alternate preferred embodiment of an end cap according to the principles of the present invention.

FIG. 10 is a side view in perspective of the support assembly shown in FIG. 6 in a shipping configuration.

DETAILED DESCRIPTION OF THE PREFERRED EMBODIMENT

Figure 1:
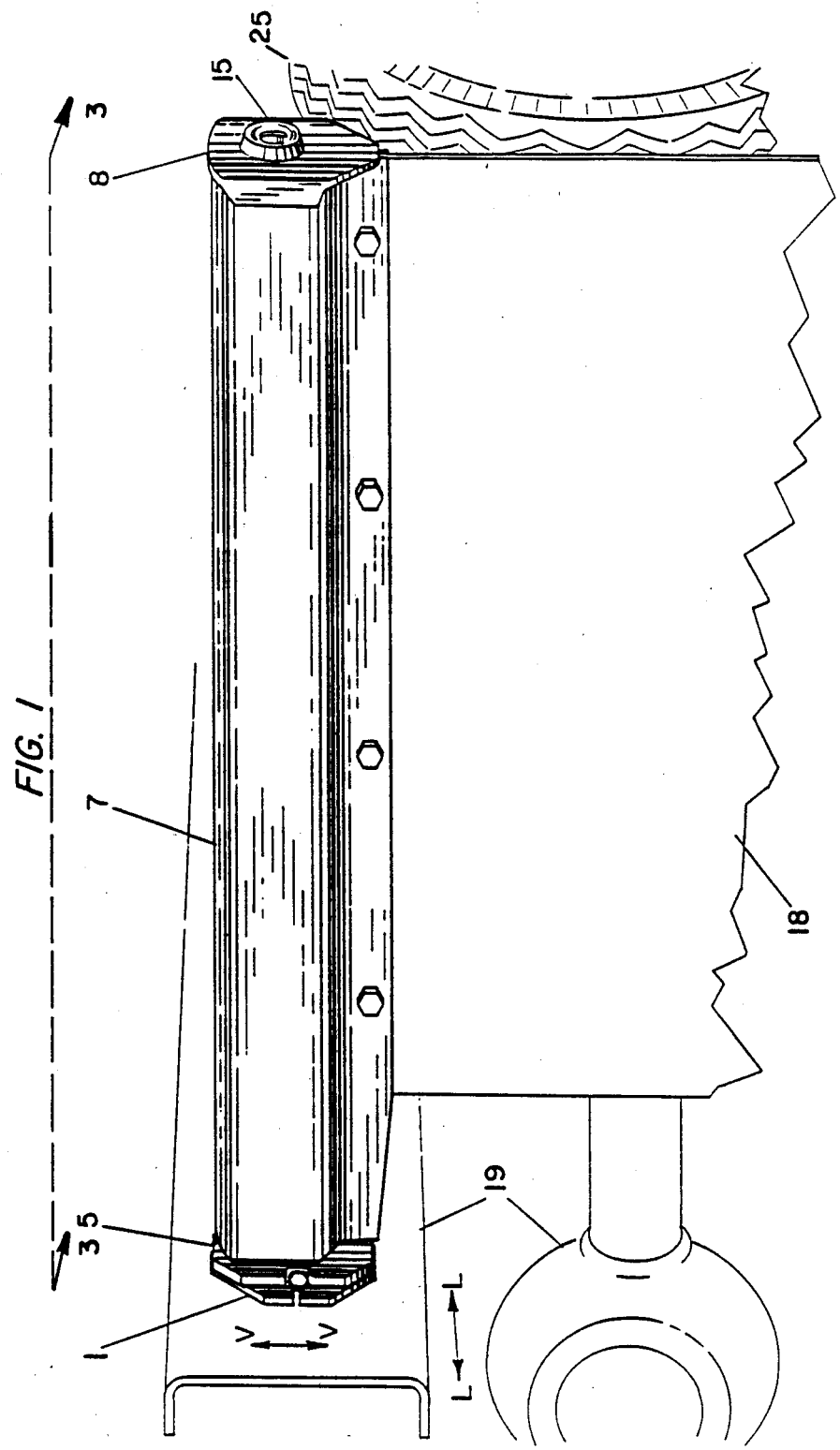
FIG. 1 is a rear elevation of a mud-flap support assembly according to the principles of the present invention mounted on the right rear of a vehicle holding a mud flap in its usual configuration.
Figure 2:
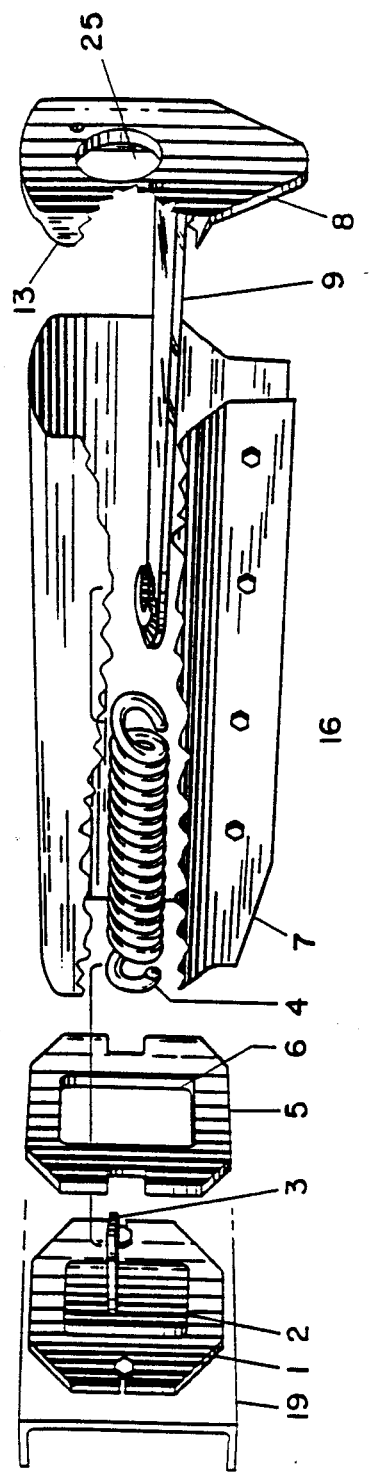
FIG. 2 is perspective, exploded, cutaway view showing the internal details of the support arm shown in FIG. 1.
Figure 3:
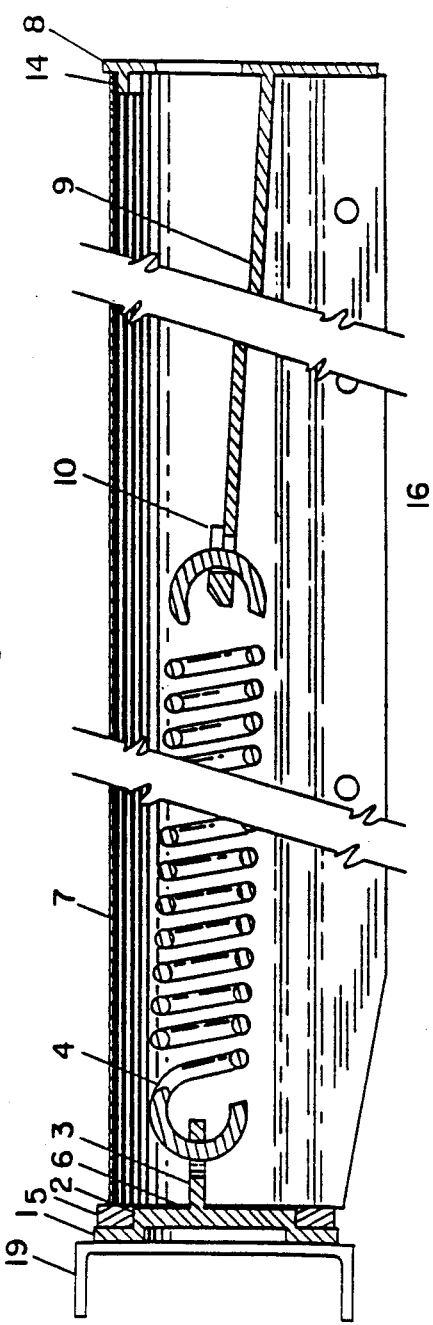
FIG. 3 is a side elevation in cross-section taken along line A illustrating the raised portion of the base plate fitting into the end of the mounting arm.

Referring now to FIGS. 1-3, a mud flap support arm assembly 16 according to the principles of the present invention is shown in its normal position mounted on a vehicle frame 19 transversely behind the rear wheels 23 of a vehicle. Suspended from the support arm assembly 16 and secured thereto by bolts and nuts or other suitable means is a truck mud flap 18. The support assembly 16 comprises an elongated tubular housing 7 having an open, flanged slot lengthwise along its lower side to facilitate mounting of the mud flap 18. The housing or support arm 7 is open at one end and has an end plate 5 attached to the other end. As shown in FIG. 2, a base plate 1 is fixedly attached to the vehicle frame 19 by bolts and nuts or other suitable means. A platform guide 2 is welded or otherwise permanently mounted to the base plate 1 and is received within the guide opening 6 formed in the support arm end plate 5 in a cooperative relationship therewith to assure that the support arm 7 will be retained in its normal position or will return to its normal position if deflected. This relationship is clearly shown in FIG. 3. A spring retaining lug 3 forms a part of the base plate, and is welded to or is an integral part of the platform guide 2 at a position substantially at the center of the base plate 1 and on the support arm housing 7 longitudinal centerline. A return spring 4 is disposed within the tubular housing 7 with one end engaged by the lug 3 and the other end coupled to an end cap 8 at the open end of housing 7. The return spring 4 is held in tension and maintains a compressive force urging the support assembly 16 onto the base plate 1 and platform guide 2. The end plate 5 is welded to the arm housing 7 and fits snugly against the base plate 1 being aligned with the platform guide 2. As described above, the return spring 4 is contained within the arm housing 7 and is connected between the lug 3 and an end cap lug and guide plate 9 at a reinforced eyelet 10 and thus attaches and retains the arm housing on the truck or trailer and the end cap 8 on the arm housing 7. Utilizing spring 4 to retain the end cap 8 in position eliminates the need for a bolt and/or nut to provide an anchor point for the spring 4. The end cap lug and guide plate 9 is positioned and attached to the end cap 8 such that the end of the return spring 4 connected or hooked to eyelet 10 is below the point that lug 3 is attached to the base plate 1 thereby causing an upward force to be exerted on the support arm assembly 16 when the return spring 4 is connected and under tension. This upward force is counterbalanced by the weight of the mud flap 18 when installed. The end cap 8 is held in its proper position on the open end of the arm housing 7 by four mechanisms: return spring 4 tension, two outside flanges 13 formed integrally with the end cap 8, an inside position guide 14 and the end cap lug and guide plate 9.

The end cap 8 have several different configurations as shown in FIGS. 1, 2, 8 and 9. A position light or reflector 15 may be installed in a hole 25 provided in end cap 8. A curved guard rod 21 may also be installed over the light 15 to provide protection against breakage. Referring specifically to FIG. 9, the end cap 8 may be closed, having no position light installed. Further, the elongated end cap lug and guide plate 9 may be lug 11 and shortened guide plate 12. In the case, a longer return spring 4 or an extension (not shown) may be required. The end cap 8 also may be provided with a vertical slot 27 in its lower edge to accomodate a mud flap 18 having a greater width then the length of the arm housing 7.

Referring now to FIGS. 6, 7, 9 and 10, a second preferred embodiment of a mud flap support assembly 26 according to the principles of the present invention is shown. The mud flap support assembly 26 comprises tubular support arm housing 7 including end plate 5 and end cap 8. A tubular end cap extension 17 having one end cut at an angle is welded or otherwise attached to end cap 8 to form an angular support arm to facilitate mounting of a mud flap 19 having an angled edge to clear the trailer landing gear 20. The extension 17 has a flanged slot along the lower side thereof for mounting a mud flap thereto with bolts and nuts or other suitable means. The straight portion 7 of the angular support arm thus formed may be shorter than the support arm 7 shown in FIGS. 1-3 and described hereinabove. As shown in detail in FIG. 6, the end cap 8 utilizes the lug 11 and shortened guide plate 12 (as shown in FIG. 9) and is held in place against the open arm of arm housing 7 by the tension in return spring 4. The support arm assembly 26 is pivotally mounted to the vehicle frame 19 as described hereinabove. Since the end cap 8 is attached to arm housing 7 by the return spring 4, the end cap 8 with extension 17 may be pivoted to a horizontal position for shipping or storage. A shipping rod 22 may be installed and bolted in place between the arm housing 7 and the extension 17 to maintain the support arm assembly in a straight configuration (as shown in FIG. 10).

OPERATION

Figure 4:
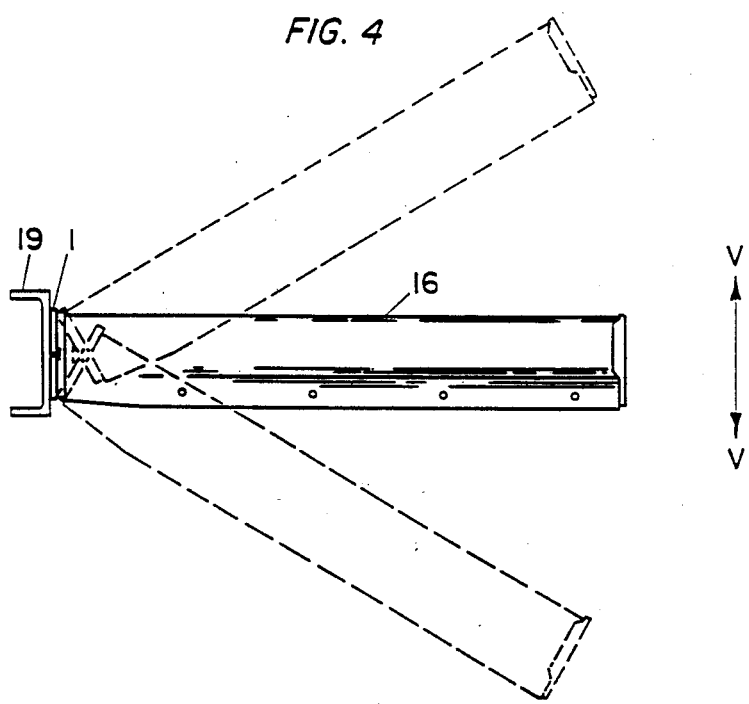
FIG. 4 is a side view illustrating the mounting arm's ability to swivel about the vehicle's vertical axis.
Figure 5:
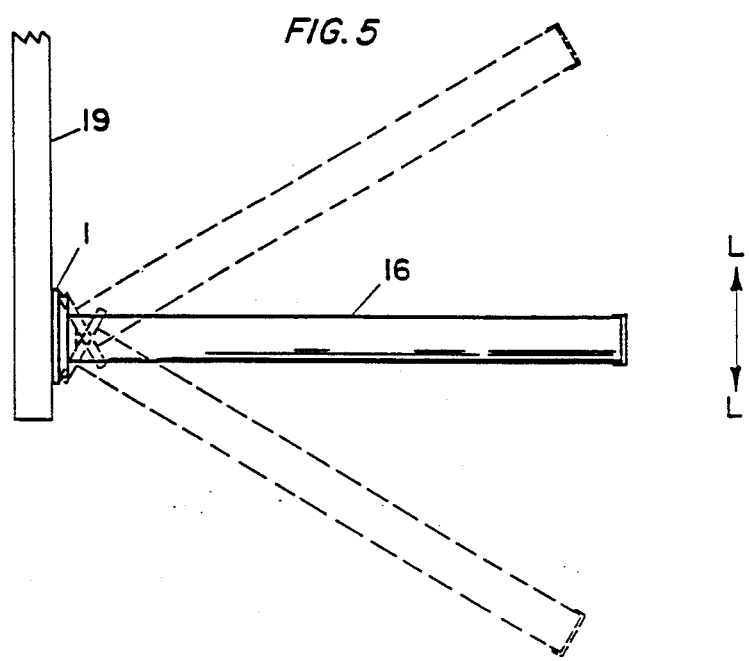
FIG. 5 is a top, plan view illustrating the invention's capability to swivel about the longitudinal axis.

Referring now also to FIGS. 4 and 5, with the base plate 1 bolted to the vehicle 19, and assemblies 16 and 26 support arm 16 constructed as described in the previous section, the support arm assembly is designed to rotate in any direction from its manual position as shown in FIGS. 1, 4, and 5. Rotation of the support arm assembly 16 may be caused by contact with an obstacle on the roadway such as a boulder, tree, mound of dirt, or the like. Vertical rotation from its normal position is shown in FIG. 4. Longitudinal rotation of the support arm assembly 16 is shown in FIG. 5. When the obstacle is passed, or no longer in a position to exert influence on support arm assembly 16, the support arm assembly 16 is drawn back to its normal position by the return spring 4, and correct positioning is provided by the guide opening 6 of the support arm end plate 5 fitting precisely over the platform guide 2 which is part of the base plate 1.

I claim:

1. A deflectable support arm assembly for mounting mud flaps and the like on a vehicle comprising:
    an elongated tubular support arm for supporting a mud flap;
    mounting means for pivotally mounting said elongated tubular support arm at a first end thereof to a vehicle, said mounting means adapted for providing pivotal movement of said elongated tubular support arm about a vertical and a horizontal axis adjacent said first end; and
    resilient means disposed within said elongated tubular support arm and connected between said mounting means and a removable external end cap positioned at a second end of said elongated tubular support arm, a first end of said resilient means being offset from a second end of said resilient means with respect to a longitudinal centerline of said elongated tubular support arm that a vertical force is exerted on said elongated tubular support arm, said resilient means urging said elongated tubular support arm in a first position, said resilient means allowing said elongated tubular support arm to pivot about said vertical and horizontal axis of said first position, said resilient means urging said elongated tubular support arm to return to said first position when said elongated tubular support arm is out of said first position, said removable external end cap including a lug removably coupling said resilient means to said removable external end cap, said resilient means urging said removable external end cap against said second end of said elongated tubular support arm and retaining said removable external end cap in place.

2. A deflectable support arm assembly as in claim 1 wherein said removable external end cap comprises a flanged cap and includes a guide plate and an alignment pin for maintaining said removable external end cap in alignment against said second end of said elongated tubular support arm, said guide plate extending lengthwise into said elongated tubular support arm, said guide plate including said removable external end cap lug coupling said resilient means to said removable external end cap.

3. A deflectable support arm assembly as in claim 2 wherein said resilient means comprises a spring means connected between a lug fixedly attached to said mounting means and said removable external end cap guide plate.

4. A deflectable support arm assembly as in claim 1 wherein said removable external end cap includes a visual indictor means mounted thereon.

5. A deflectable support arm assembly for mounting mud flaps and the like on a vehicle comprising:
   an elongated support arm for supporting a mud flap;
   mounting means for pivotally mounting said elongated tubular support arm at a first end thereof to a vehicle, said mounting means adapted for providing pivotal movement of said elongated tubular support arm about a vertical and a horizontal axis adjacent said first end;
   a removable external end cap positioned at a second end of said elongated tubular support arm, said removable external end cap including a visual indicator mounted thereon comprising an electric light; and
   reslient means disposed within said elongated tubular support arm and connected between said mounting means and said removable external end cap, a first end of said resilient means being offset from a second end of said resilient means with respect to a longitudinal centerline of said elongated tubular support arm such that a vertical force is exerted on said elongated tubular support arm, said resilient means urging said elongated tubular support arm against said mounting means with sufficient force to retain said elongated tubular support arm in a first position, said resilient means allowing said elongated tubular support arm to pivot about said vertical and horizontal axis of said position, said resilient means urging said elongated tubular support arm to return to said first position when said elongated tubular support arm is out of said first position.

6. A deflectable support arm assembly as in claim 5 wherein said removable external end cap comprises a flanged cap and includes a guide plate and an alignment pin for maintaining said removable external end cap in alignment against said second end of said elongated tubular support arm, said guide plate extending lengthwise into said elongated tubular support arm.

7. A deflectable support arm assembly as in claim 6 wherein said resilient mean comprises a spring means connected between a lug fixedly attached to said mounting means and said removable external end cap guide plate.

8. A deflectable support arm assembly for mounting mud flaps and the like on a vehicle comprising:
   an elongated tubular support arm for supporting a mud flap;
   mounting means for pivotally mounting said elongated tubular support arm at a first end thereof to a vehicle, said mounting plate adapted for providing pivotal movement of said elongated tubular support arm about a vertical and a horizontal axis adjacent said first end;
   a removable external end cap disposed at a second end of said elongated tubular support arm, said removable external end cap including an elongated extension fixedly mounted to said removable external end cap at a predetermined angle for providing clearance between said deflectable support arm assembly and components of said vehicle, said elongated extension extending the length of said elongated tubular support arm; and
   resilient means disposed within said elongated tubular support arm and connected between said mounting means and said removable external end cap, a first end of said resilient means being offset from a second end of said resilient means with respect to a longitudinal centerline of said elongated tubular support arm such that a vertical force is exerted on said elongated tubular support arm, said resilient means urging said elongated tubular support arm against said mounting means with sufficient force to retain said elongated tubular support arm in a first position, said resilient means allowing said elongated tubular support arm to pivot about said vertical and horizontal axis out of said first position, said resilient means urging elongated tubular support arm to return to said first position when said elongated tubular support arm is out of said first position.

9. A deflectable support arm assembly as in claim 8 wherein said removable external end cap comprises a flanged cap and includes a guide plate and an alignment pin for maintaining said removable external end cap in alignment against said second end of said elongated tubular support arm, said guide plate extending lengthwise into said elongated tubular support arm.

10. A deflectable support arm assembly as in claim 9 wherein said resilient means comprises a spring means connected between a lug fixedly attached to said mounting means and said removable external end cap guide plate.

11. A deflectable support arm assembly as in claim 5 wherein said removable external end cap further comprises guard means mounted over said electric light for preventing damage to said electric light.

12. A deflectable support arm assembly as in claim 4 wherein said visual indicator means comprises a light reflector mounted on said removable external end cap external to said elongated tubular support arm.

13. A deflectable support arm assembly as in claim 2 wherein said removable external end cap further comprises guard means mounted over said light reflector for preventing damage to said light reflector.

14. A deflectable support arm assembly as in claim 8 wherein said elongated extension comprises a tubular extension including means for mounting a mud flap thereto.

15. A deflectable support arm assembly as in claim 8 wherein said removable external end cap may be pivoted to dispose said angled extension in a parallel and coaxial relationship with said elongated tubular support arm.

16. A deflectable support arm assembly as in claim 15 further including rigid support means removably mounted between said angled extension and said elongated tubular support arm to maintain said parallel and coaxial relationship.

* * * * *